Sept. 8, 1970  B. J. NEEDHAM ET AL  3,527,753
PROCESS FOR PREPARING A MIXTURE OF ISOHYDRAZONES AND AZINES
Filed March 24, 1967
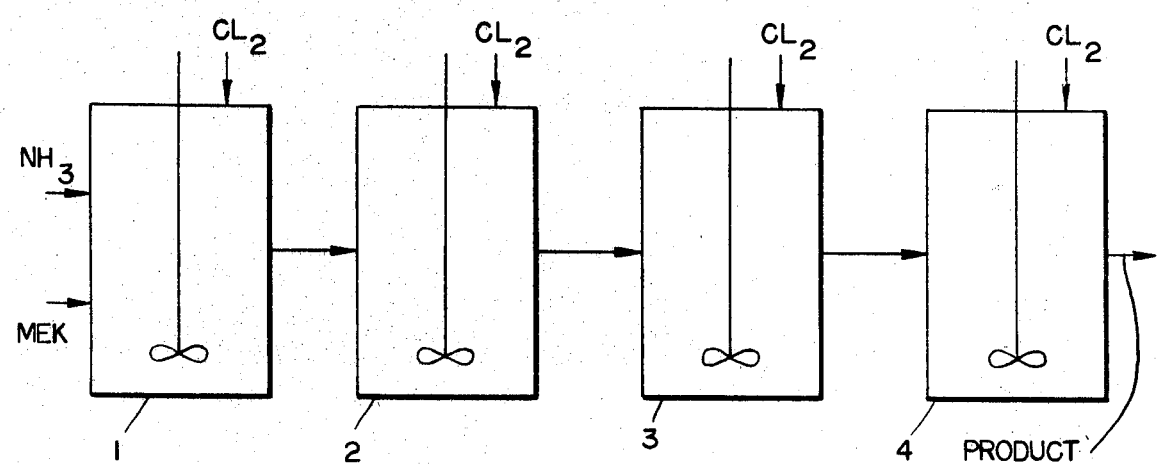
INVENTORS
BRIAN JOHN NEEDHAM
MICHAEL ARTHUR SMITH
BY
Richard P. Crowley
ATTORNEY

# United States Patent Office 3,527,753
Patented Sept. 8, 1970

3,527,753
PROCESS FOR PREPARING A MIXTURE OF ISOHYDRAZONES AND AZINES
Brian John Needham and Michael Arthur Smith, Loughborough, England, assignors to Fisons Industrial Chemicals Limited, Loughborough, Leicestershire, England
Filed Mar. 24, 1967, Ser. No. 625,816
Claims priority, application Great Britain, Mar. 29, 1966, 13,736/66
Int. Cl. C07d 45/00
U.S. Cl. 260—239                                    10 Claims

ABSTRACT OF THE DISCLOSURE

Gaseous chlorine is reacted with aqueous ammonia in the presence of a carbonyl compound to give a mixture containing isohydrazone and azine which may be converted to hydrazine.

BACKGROUND OF THE INVENTION

The present invention is concerned with improvements in the manufacture of hydrazine, particularly relating to the preparation of isohydrazones and azines which are readily convertible to hydrazine.

It is known that isohydrazones are formed by reacting chlorine with a carbonyl compound in the presence of an excess of gaseous ammonia. This reaction is generally carried out under anhydrous, or near anhydrous, conditions which leads to the formation of isohydrazones without significant formation of azine. The excess of ammonia has to be recovered from the solution and recycled as a gas. This makes the process expensive to operate and it is difficult to remove solid ammonium chloride from the gas to be recycled. This ammonium chloride removal is essential to avoid blockages in the recycle lines and to prevent catalytic decomposition of the chloramine.

It has now been found that by carrying out such a reaction in the aqueous phase, considerable economy in ammonia usage may be obtained, and the recycle of gaseous ammonia avoided. The resulting product is a mixture of isohydrazone and azine, but this mixture may be converted to hydrazine in just the same way as the isohydrazone.

SUMMARY OF THE INVENTION

Accordingly, the present invention is for a process which comprises reacting gaseous chlorine with aqueous ammonia in the presence of a carbonyl compound.

BRIEF DESCRIPTION OF THE DRAWING

The drawings represent diagrammatically four stirred reaction vessels 1, 2, 3 and 4 arranged on a cascade system. Ammonia and carbonyl compound are fed to vessel 1 and chlorine is fed to vessels 1, 2, 3 and 4. There is a flow of reaction material from vessel 1 through vessels 2 and 3 to vessel 4. Product is taken from vessel 4.

DESCRIPTION OF THE PREFERRED EMBODIMENTS

It is necessary to use an excess of ammonia in relation to chlorine; suitably the mole ratio of ammonia to chlorine is in the range 4:1 to 50:1, preferably it is in the range 6:1 to 20:1.

The carbonyl compound which is used in the present invention may be a ketone or an aldehyde of the formula:

wherein $R^1$ is hydrogen; alkyl, preferably containing 1 to 4 carbon atoms such as methyl, ethyl, propyl or butyl; $R^2$ is alkyl, preferably containing 1 to 4 carbon atoms such as for example methyl, ethyl, propyl or butyl; or aryl such as for example phenyl or wherein $R^1$ and $R^2$ together with the carbon atom of the carbonyl group form a cycloaliphatic ring. Examples of suitable carbonyl compounds are acetaldehyde, propionaldehyde, methyl-isobutyl ketone, diethyl ketone, benzaldehyde and cyclohexanone. Preferably the carbonyl compound is acetone or methyl ethyl ketone.

Preferably 2 to 6 moles of carbonyl compound are used per mole of chlorine. This is a lower ratio than can be used in other processes.

The process of the present invention may be operated at atmospheric pressure or elevated pressures. If superatmospheric pressures are used the pressure is preferably not more than 20 atmospheres above atmospheric pressure.

The temperature at which the present process is operated is not particularly critical and temperatures up to about 50° C. but below the decomposition temperature of the isohydrazone may be used. Many isohydrazones undergo decomposition above 40–50° C., and in such cases lower temperatures should be used.

If desired the chlorine can be diluted with an inert gas such as nitrogen for instance with 1 to 4 moles of nitrogen for every mole of chlorine, but this is not necessary, as even with undiluted chlorine the reaction is not vigorous.

The reaction may be performed continuously or batchwise. If it is performed continuously the reaction may take place in either a tank reactor, or a series of reactors arranged on a cascade system or a tube reactor. According to one embodiment of the invention, the reaction takes place in a simple stirred reactor, passing chlorine gas into an aqueous solution of ammonia containing the carbonyl compound. According to a preferred embodiment of the invention the process is carried out in two or more stages in a cascade. Suitably ammonia and the carbonyl compound are fed to the first vessel in the series, to which chlorine is introduced, the product overflows to a second reactor where further chlorine is introduced and so on. It has been found suitable to carry out the process in four stages.

The formed mixture of azine and isohydrazone may be converted to hydrazine. Thus, for example, by treatment with a strong acid, such as hydrochloric acid or sulfuric acid, the azine and isohydrazone are hydrolyzed to the carbonyl compound and the corresponding hydrazine salt. Hydrazine hydrate may be obtained from the hydrazine salt by conventional means.

Where hydrazine hydrate is required, this may be obtained directly from the mixture of azine and hydrazone, for example by treatment with a cation exchange material in the hydrogen form at a temperature in excess of 40° C., whereby the azine and isohydrazone are hydrolysed to hydrazine and the carbonyl compound, the hydrazine being retained on the cation exchange resin. Treatment of the cation exchange material with a base liberates the hydrazine which is recovered as an aqueous solution of hydrazine hydrate.

The following examples are given to illustrate the present invention.

EXAMPLE 1

Chlorine gas was passed into a simple stirred reactor containing an aqueous solution of 27% ammonia (40 moles) containing methylethylketone (5 moles) at ambient temperature. The product comprises a mixture of 27% azine and 73% isohydrazone. The yield, as hydrazine, amounted to 90%.

Sulphuric acid was added to the reaction product so that the final pH was 1–2; the solution was cooled and the precipitated monhydrazine sulphate filtered off.

EXAMPLE 2

Using the apparatus shown in the accompanying drawing, 40 moles of ammonia, 8 moles of methylethylketone and 1 mole of chlorine were introduced into stirred reactor 1. The resulting product overflowed into reactor 2, into which 1 mole of chlorine was introduced. The resulting product flowed into reactor 3, where a further 1 mole of chlorine was introduced. This product overflowed into reactor 4, where a final 1 mole of chlorine was introduced. The product was removed from reactor 4. The ratio of ammonia:methylethylketone:chlorine in the four reactors was therefore 40:8:1, 36:7:1, 32:6:1 and 28:5:1. The overall ratio was thus 10:2:1, which is very economical. The product obtained in a 90% yield comprised a mixture of 27% azine and 73% isohydrazone.

The reaction product was extracted with methylethylketone in a liquid/liquid extractor; the organic phase was separated and freed from ammonia by degassing under reduced pressure. The resulting solution was mixed with an equal volume of water and the solution raised to boiling with the sulphonated polystyrene resin cross-linked with divinyl benzene commercially available as Zeo Karb 225, in amount comprising 40 parts per mol of hydrazine, and then cooled. The resin was filtered off, washed with water, and the hydrazine eluted with aqueous ammonia as an aqueous solution of hydrazine hydrate.

The aqueous phase obtained from the liquid/liquid extraction was basified and the ammonia distilled out. The ammonia can be absorbed in water and recycled to the synthesis stage.

It is a feature of the process of the present invention that the product of the process comprising an aqueous solution of isohydrazone and azine is extracted with a water immiscible solvent, to extract the isohydrazone and azine into the organic phase, and the aqueous phase is separated, basified (for example with sodium hydroxide or lime) and the resulting solution distilled to remove the ammonia, which is absorbed in water and recycled to the process.

We claim:

1. A process for the manufacture of a mixture of isohydrazones and azines which process comprises: reacting gaseous chlorine with a stoichiometric excess of aqueous ammonia in the absence of a strong base, but in the presence of a carbonyl compound which carbonyl compound is a ketone or aldehyde of the formula:

wherein $R^1$ is selected from the group consisting of hydrogen and 1–4 carbon alkyl groups; $R^2$ is selected from the group consisting of 1–4 carbon alkyl groups and phenyl; and $R^1$ and $R^2$ taken together are cyclohexone.

2. A process as claimed in claim 1 wherein the mole ratio of ammonia to chlorine is in the range 4:1 to 50:1.

3. A process as claimed in claim 2 wherein the mole ratio of ammonia to chlorine is in the range 6:1 to 20:1.

4. A process as claimed in claim 1 wherein the carbonyl compound is acetone or methyl ethyl ketone.

5. A process as claimed in claim 1 wherein 2 to 6 moles of carbonyl compound are used per mole of chlorine.

6. A process as claimed in claim 1 wherein the process is carried out in a series of at least two reactors arranged as a cascade system.

7. A process as claimed in claim 6 wherein the process is carried out in a series of 4 reactors.

8. A process as claimed in claim 6 in which the aqueous ammonia and the carbonyl compound are added to the first reactor only, chlorine being added to the first subsequent reactors.

9. A process as claimed in calim 1 wherein the product is extracted with a water immiscible solvent, the organic phase containing the isohydrazone and azine being worked up for the recovery on hydrolysis of the isohydrazone and azine and the aqueous phase being worked up for the recovery of ammonia.

10. A process as claimed in claim 9 wherein the aqueous phase is basified and distilled, and the ammonia distilled off and absorbed in water, and recycled to the first stage of the process.

References Cited

UNITED STATES PATENTS 3,387,919    6/1968    Abendroth et al. _____ 260—239

FOREIGN PATENTS 893,388    4/1962    Great Britain.

OTHER REFERENCES

Treybal, Mass Transfer Operations (New York, 1955), pp. 97–99.

ALTON D. ROLLINS, Primary Examiner

U.S. Cl. X.R.

23—117, 190; 260—566